ତ୍ର
3,573,314
SUBSTITUTED-8-QUINOLINOLS

Marjan Kolobielski, Baltimore, Md., assignor to the United States of America as represented by the Secretary of the Army
No Drawing. Filed Aug. 17, 1967, Ser. No. 662,562
Int. Cl. C07d 33/44
U.S. Cl. 260—289                    6 Claims

ABSTRACT OF THE DISCLOSURE
Novel 5-substituted-8-quinolinols.

The invention described herein may be manufactured, used and licensed by or for the Government for governmental purposes without the payment to me of any royalty thereon.

The invention relates to the synthesis of novel 5-substituted-8-quinolinols which may be utilized as corrosions inhibitors in a pickling bath composed of aqueous solutions of inorganic acids such as hydrochloric, sulfuric, phosphoric and the lke.

The novel compounds of my invention are derivatives of 8-quinolinol having an oxygenated side chain of the structural formula:

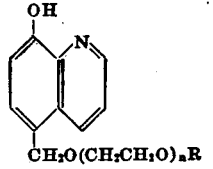

wherein R is selected from the group consisting of hydrogen and an alkyl radical containing from 1 to 20 carbons. $n$ represents an integer of 1 to 4.

In practice, the novel derivatives of 8-quinolinol are produced by reacting 5-chloromethyl-8-quinolinol hydrochloride with a hydroxy-compound of the formula $$HO(CH_2CH_2O)_nR$$

wherein R and $n$ have the significance defined above. The 5-chloromethyl-8-quinolinol hydrochloride was prepared in accordance with the method of; J. H. Burckhalter and R. I. Leib, Jr. of Organic Chem., vol. 26, p. 4078 (1961). Representative hydroxy-compounds which may be utilized in the reaction with 5-chloromethyl-8-quinolinol are glycols and monoalkyl ethers such as: ethylene glycol, diethylene glycol, triethylene glycol, tetraethylene glycol, ethylene glycol monoalkyl ether, diethylene glycol monoalkyl ether and tetraethylene glycol monoalkyl ether. The alkyl radical, which contains up to 20 carbon atoms, may be straight or branched chain.

The preferred method of producing the novel oxygenated derivatives of 8-quinolinol comprises the heating of 5-chloromethyl-8-quinolinol hydrochloride with the previously mentioned type of hydroxy-compounds at a temperature ranging from 80° to 200° C. At the termination of the reaction, the product may be recovered by any conventional means, e.g., by filtration to remove the precipitated hydrochloride salt and then subjecting the recovered material to further purification. As an illustration, the reaction of 5-chloromethyl-8-quinolinol hydrochloride with the hydroxy-compounds proceeds as follows:

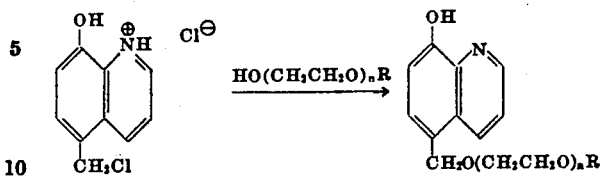

EXAMPLE 1

Forty six grams (0.2 mole) of 5-chloromethyl-8-quinolinol hydrochloride was added to 248 grams (4 moles) of dried ethylene glycol. After the stirred mixture was heated for a period of 4 hours at a temperature of 120° C., the reaction was terminated. The mixture was cooled to around room temperature and poured in around 2 liters of diethyl ether. A lower oil phase contained the desired product was recovered. The recovered phase was washed with diethyl ether and subsequently dissolved in water. The resultant aqueous solution was made alkaline by the addition of sodium bicarbonate thereby yielding 28 grams (64% yield) of 5-(2-hydroxyethoxymethyl)-8-quinoiinol. Fractional distillation of the product followed by recrystallization from benzene afforded a sample having a melting point of 108–109° C. The structural formula of the recovered product is:

*Analysis.*—Calculated for $C_{12}H_{13}NO_3$ (percent): C, 65.75; H, 5.94; N, 6.39. Found (percent): C, 65.74; H, 5.52; N, 6.34.

EXAMPLE 2

A mixture of 46 grams (0.2 mole) of 5-chloromethyl-8-quinolinol hydrochloride and 300 grams (2.8 moles) of anhydrous diethylene glycol were stirred at a temperature of 120° C. for a period of 4 hours. After cooling to around room temperature, the mixture was added to 1200 ml. of water. A sufficient amount of sodium bicarbonate was added to the aqueous mixture to render it alkaline. The aqueous mixture was extracted with a diethyl ether solvent. The recovered solute was dissolved in diethyl ether, and anhydrous hydrogen chloride was passed through the solution to precipitate the hydrochloride salts. The recovered hydrochloride salt was dissolved in water and the solution made alkaline by the addition of sodium bicarbonate. The alkaline solution was extracted with diethyl ether and the solute dissolved in benzene and allowed to stand at 0° C. for a period of several days. A yield of 12.6 grams (24% yield) of 5-(7-hydroxyl-2,5-dioxaheptyl)-8-quinolinol having a melting point of 56–58° C. was obtained. The product was further purified by sublimation at 150–160° C./0.05 mm. Crystallization from benzene afforded a pure sample having a melting point of 61–62° C. The structural formula of the product is:

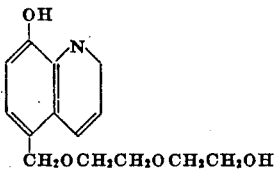

CH₂OCH₂CH₂OCH₂CH₂OH

*Analysis.*—Calculated for C₁₄H₁₇NO₄ percent): C, 63.88; H, 6.46; N, 5.32. Found (percent): C, 63.78; H, 6.38; N, 5.34.

EXAMPLE 3

A mixture of 23 grams (0.1 mole) of 5-chloromethyl-8-quinolinol hydrochloride and 152 grams (2 moles) of ethylene glycol monomethyl ether was stirred at reflux temperature for a period of 4 hours. After cooling to around room temperature, the mixture was poured into diethyl ether. The solid hydrochloride salt, which precipitated, was recovered by filtration and dissolved in water. The solution was made alkaline by the treatment with sodium bicarbonate. A solid precipitate was recovered by filtration representing 16 grams of the crude product. On distillation, a main fraction of 10 grams (a 43% yield) of 5-(2-methoxyethoxymethyl)-8-quinolinol was recovered having a boiling point 137–142° C./0.1 mm. and a melting point of 67–70° C. Repeated crystallization from heptane afforded a pure sample having a melting point of 70–71° C. The structural formula of the product is:

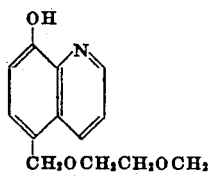

CH₂OCH₂CH₂OCH₃

*Analysis.*—Calculated for C₁₃H₁₅NO₃ (percent): C, 66.95; H, 6.44, N, 6.01. Found (percent): C, 66.94; H, 6.41; N, 5.97.

EXAMPLE 4

A mixture of 46 grams (.02 mole) of 5-chloromethyl-8-quinolinol hydrochloride and 240 grams (2.0 moles) of diethylene glycol monoethyl ether were heated with stirring at a temperature of 120–125° C. for a period of 4 hours. The mixture was concentrated by distilling in vacua the excess of diethylene glycol monoethyl ether. The residual product was treated with diethyl ether. The precipitated salts were separated by filtration and dissolved in water. The resultant aqueous solution was made alkaline by the addition of sodium bicarbonate and the alkaline aqueous solution extracted with ether. On distillation a main fraction of 29.5 grams (54% yield) of the crude polyether having a boiling point of 186–193° C./0.2 mm. was obtained. Redistillation yielded 15 grams of pure 5-(2,5,8-trioxanonyl)-8-quinolinol having a boiling point of 172–174° C./0.05 and a refractive index of $n_D^{24}$ 1.5742. The structural formula of the polyether is:

CH₂OCH₂CH₂OCH₂CH₂OCH₃

*Analysis.*—Calculated for C₁₅H₁₉NO₄ (percent): C, 64.98; H, 6.86; N, 5.05. Found (percent): C, 64.94; H, 6.82; N, 4.98.

EXAMPLE 5

A mixture of 69 grams (0.3 mole) of 5-chloromethyl-8-quinolinol hydrochloride and 214 grams (1.3 moles) of triethylene glycol monomethyl ether were heated with stirring at a temperature of 125–130° C. for a period of 5 hours. A solid, insoluble in the mixture, was removed by filtration and washed with ether. The filtrate which contained an excess of triethylene glycol monomethyl ether was diluted with diethyl ether thereby yielding a hydrochloride salt precipitate. The precipitate was removed by filtration, dissolved in water and the aqueous solution made alkaline by the addition of sodium bicarbonate. Extraction with diethyl ether gave 44 grams of an oil as the residual material, which was purified by distillation. A main fraction of 26.3 grams (27.5% yield) of 5-(2,5,8-11-tetroxadodecyl)-8-quinolinol having a boiling point of 193–200°C./1–0.2 mm. was obtained. The structural formula of the product is:

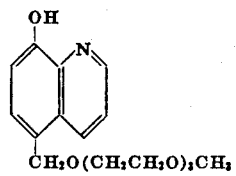

CH₂O(CH₂CH₂O)₃CH₃

*Analysis.*—Calculated for C₁₇H₂₃NO₅ (percent): C, 63.55; H, 7.17; N, 4.36. Found (percent): C, 63.42; H, 7.09; N, 4.40.

Having described my invention, I claim:

1. A compound having the structural formula:

CH₂O(CH₂CH₂O)ₙR wherein R is selected from the group consisting of hydrogen and an alkyl radical having from 1 to 20 carbon atoms, and n is an integer of from 1 to 4 inclusive.

2. 5-(2-hydroxyethoxymethyl)-8-quinolinol.
3. 5-(7-hydroxy-2,5-dioxaheptyl)-8-quinolinol.
4. 5-(2-methoxyethoxymethyl)-8-quinolinol.
5. 5-(2,5,8-trioxanonyl)-8-quinolinol.
6. 5-(2,5,8,11-tetroxadodecyl)-8-quinolinol.

References Cited

UNITED STATES PATENTS 2,858,315  10/1958  Matten et al. _____ 260—289
3,444,173  5/1969  Goldman _____ 260—289X DONALD G. DAUS, Primary Examiner U.S. Cl. X.R.

256—148; 260—286